Aug. 20, 1968     H. W. STURGES     3,397,900
HITCH FOR VEHICLE
Filed July 12, 1966     3 Sheets-Sheet 2
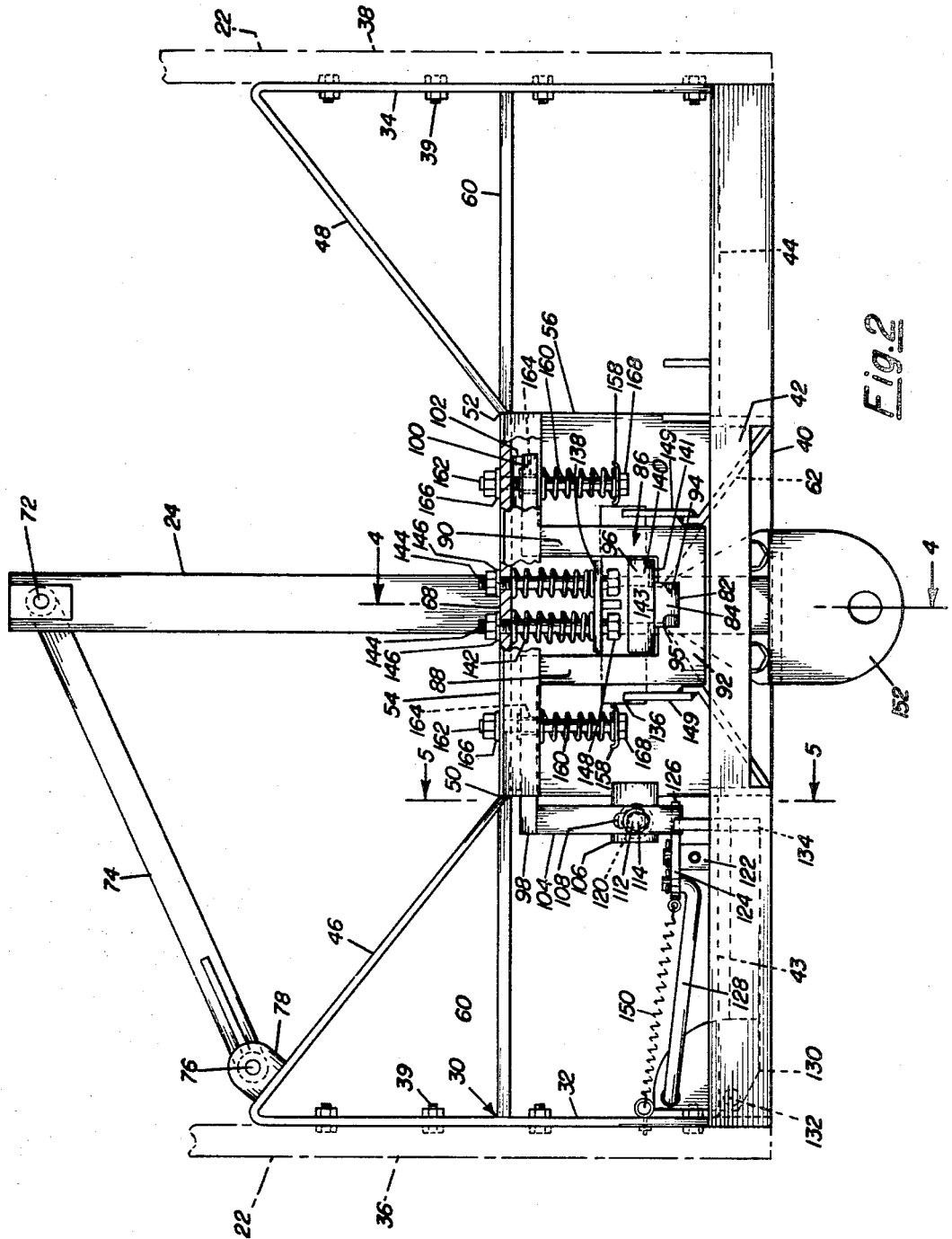
INVENTOR.
HAROLD W. STURGES
BY
ATTORNEYS Aug. 20, 1968   H. W. STURGES   3,397,900
HITCH FOR VEHICLE Filed July 12, 1966   3 Sheets-Sheet 3

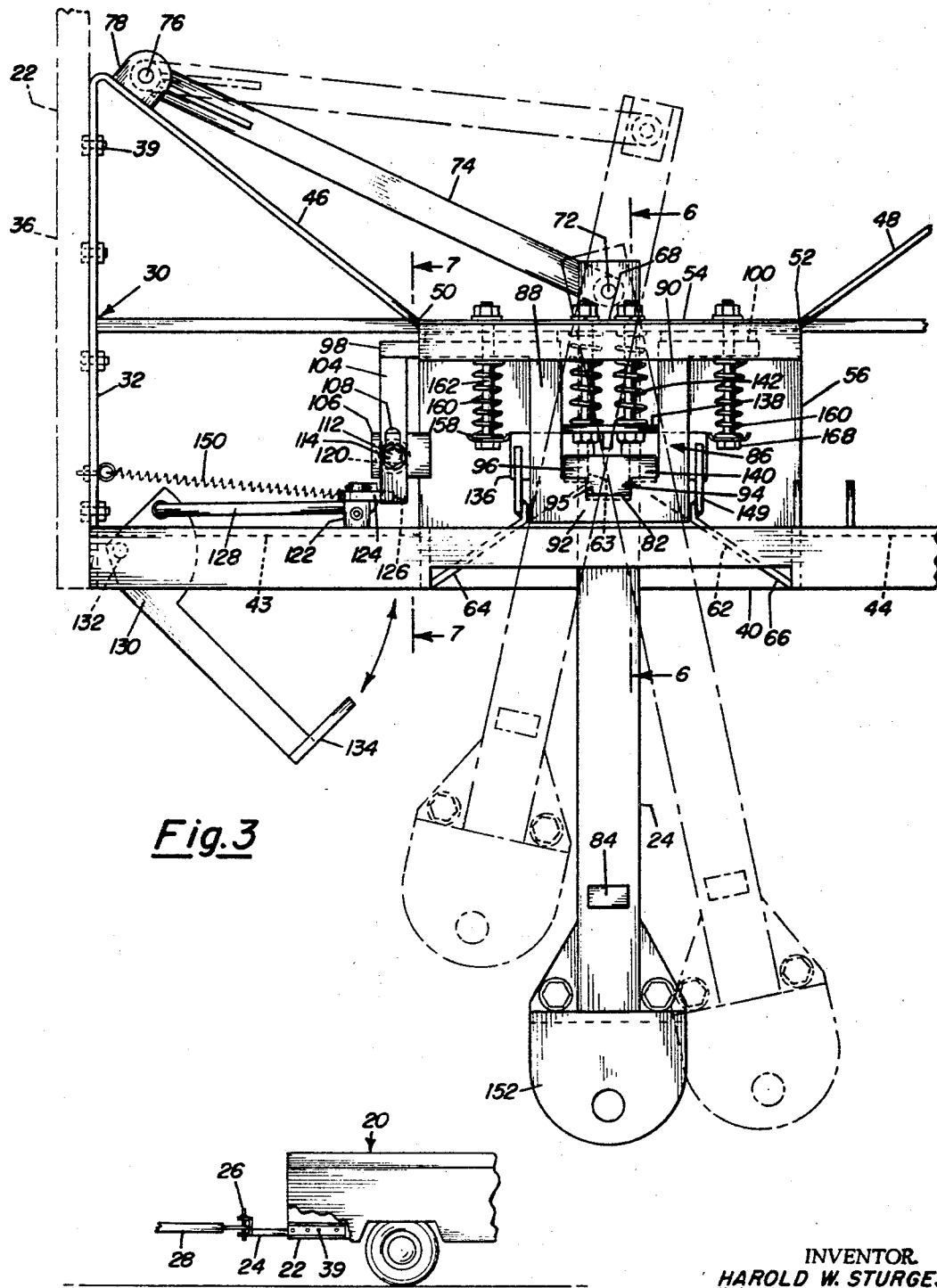

INVENTOR.
HAROLD W. STURGES

ATTORNEYS

United States Patent Office 3,397,900
Patented Aug. 20, 1968

3,397,900
HITCH FOR VEHICLE
Harold W. Sturges, 500 E. 7th St.,
Holtville, Calif. 92250
Filed July 12, 1966, Ser. No. 564,597
5 Claims. (Cl. 280—478)

ABSTRACT OF THE DISCLOSURE

A hitch for connecting another vehicle, such as a trailer, to an automobile, the hitch including a frame secured to the chassis of the pulling vehicle, which frame pivotally supports an extendable and contractable draw bar and a movable latching element. The draw bar carries a cooperating latching element. A retainer holds the latching element in non-latching position and this retainer is rendered ineffective when the draw bar is moved forwardly or the pulling vehicle is moved rearwardly.

---

The present invention relates to a hitch for connecting a vehicle, such as an automobile, to a trailer.

In practicing the present invention, a hitch frame is secured to the chassis of a pulling vehicle. This hitch frame provides a support for a draw bar and also carries a movable latching element. A draw bar is slidably carried by the support of the frame and includes a shoulder which forms a second latching element which is co-operable with the movable latching element, aforesaid, to form a latch through which the draw bar is moved with the pulling vehicle.

The movable latching element can be moved out of latching position with the latching element on the draw bar. A retainer is provided for holding the latch elements in non-latching position subsequent to the moving of the movable latching element to the non-latching position whereby the draw bar can be moved rearwardly relative to the pulling vehicle. The draw bar can be moved forwardly, and, by such movement, it renders the retainer ineffective and such movement renders the movable latching element effective for latching the draw bar to the vehicle.

In the embodiment illustrated, the draw bar is pivotally attached to the vehicle frame. Also, in the embodiment illustrated, the connection between the draw bar and which frame is such that when the draw bar is unlatched, and moved rearwardly, it can be swung to the right or left.

Another feature of the present invention lies in the use of resilient means in the form of springs interposed between the vehicle frame and the draw bar.

Other features and the advantages of the present invention will be apparent from the following description, reference being had to the accompanying drawings wherein a preferred embodiment of the invention is illustrated.

In the drawings:

FIG. 1 is a fragmentary side view of the rear of an automobile and a fragmentary side view of the tongue of a trailer connected with the present hitch, when the draw bar of the hitch is in its rearmost position, part of the automobile being shown in section to show the chassis frame to which the hitch frame is connected;

FIG. 2 is a fragmentary top plan view of part of a chassis of the automobile, together with a top plan view of the hitch, the latter being shown in the position in which the draw bar is in retracted position, parts thereof being shown in section;

FIG. 3 is a view similar to FIG. 2 but showing the draw bar in its normal pulling relationship with the automobile;

Figure 4:
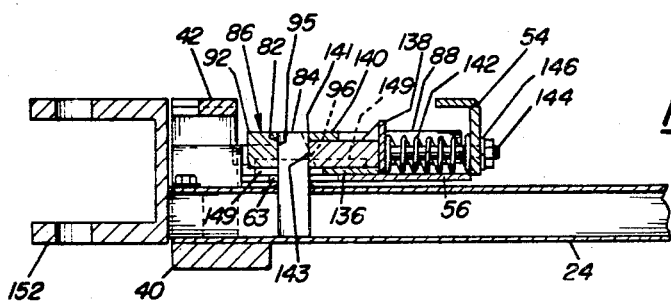
Figure 5:
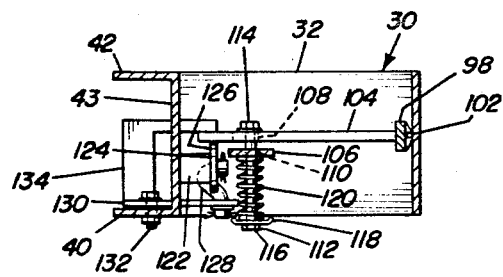
Figure 6:
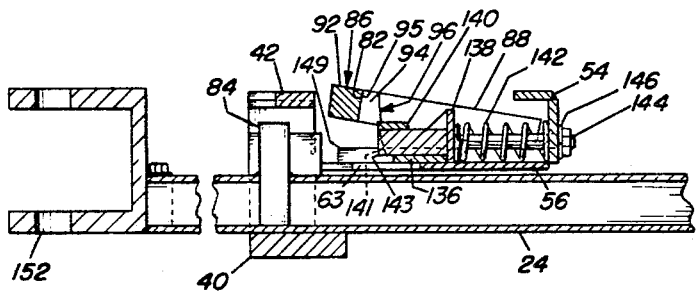
Figure 7:
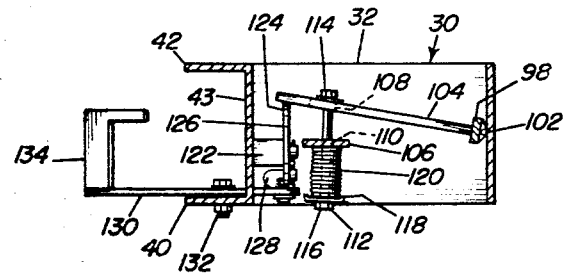

FIGS. 4 and 5 are fragmentary views taken along lines 4—4 and 5—5, respectively, of FIG. 2; and FIGS. 6 and 7 are fragmentary views taken along lines 6—6 and 7—7, respectively, of FIG. 3.

Referring more in detail to the drawings, the pulling vehicle is shown in the form of an automobile 20 and part of the frame of the chassis is shown at 22. The draw bar 24 is shown extended in FIG. 1 and is suitably connected by a pin 26 to the tongue 28 of a trailer.

The frame for the draw bar is shown at 30, the frame being formed preferably of heavy sheet steel. The frame 30 includes two side sections 32 and 34 which are bolted to the channel irons 36 and 38, respectively, of the vehicle chassis frame 22 by bolts 39 and therefore, this frame 30 becomes an integral part of the chassis frame of the automobile.

The frame also includes a lower section 40 and an upper section 42 which are suitably welded to the rear ends of sections 32 and 34. An upright wall 43 is welded to the forward edges of the left portions of sections 40 and 42 and an upright section 44 is welded to the forward edges of the right portions of sections 40 and 42.

The forward end of section 30 is bent inwardly and rearwardly to form a section 46 and a forward end of section 34 is bent inwardly and rearwardly to form a section 48. The ends 50 and 52 of sections 46 and 48 are suitably welded to an upright centrally disposed section 54. A floor 56 of heavy gauge steel is disposed horizontally and extends rearwardly from section 54 and is suitably welded to said section 54 and to the bottom of the guide plates 64 and 66. The section 54 also includes integral and transversely extending sections 60, one end of one section 60 is welded to the section 32 and the other sections has one end welded to the section 34. The rear end of the floor 56 is provided with a V-shaped notch 62 which terminates forwardly into a rectangular slot 63, disposed centrally thereof. It is to be observed that the portion of the frame intermediate the upright walls 43 and 44 does not have an upright wall but is provided with the guide plates 64 and 66 which are welded at the top to plate 42. These guide plates extend rearwardly and outwardly at the same angle as the notch 62.

The draw bar 24 is slidably supported below the floor 56 on the central portion of the frame section 40. The forward end of the draw bar 24 is pivotally connected by a pin 72 to a link 74 which, in turn, is pivotally connected by a pin 76 between two horizontally extending ears 78 carried by the section 46. When the draw bar is pulled rearwardly, as shown in FIG. 3, it can also be swung to the right or left about the pivot pin 72. The draw bar is provided with a rearwardly facing shoulder forming a latching element 82. This shoulder is formed by an upwardly extending boss 84.

A U-shaped latching element 86 includes spaced legs 88 and 90 and a yoke 92 connecting the rear ends of these legs 88 and 90. The yoke 92 is provided with a forwardly extending rectangularly shaped notch 94, the rearward portion 95 thereof forming a latching surface which cooperates with the latching surface 82 to provide for moving the draw bar forwardly when the automobile moves forwardly. The forward surfaces 96 of the yoke 92 are inclined downwardly and forwardly to form camming surfaces. The forward ends of the legs 88 and 90 are connected with transversely extending arms 98 and 100, respectively. The forward ends of these arms carry beads 102 providing pivot bearings which bear in suitable notches in the rear side of the section 54 whereby the rear end of the latch 86 can be pivotally raised and lowered.

FIGS. 2 and 4 show the latching element 86 in its latching position and FIGS. 3 and 6 show the latching element 86 in its non-latching position. The latching element 86 is raised and lowered about the bead 102 through an arm 104 which extends rearwardly from the left end of arm 98. An ear forming a spring seat 106 is fixed to the floor 56; it is disposed rearwardly of the arm 98 and below the arm 104. Aligned holes 108 and 110 are provided in the arm 104 and ear 106, respectively, for receiving a bolt 112. The head 114 of the bolt rests on the top of the arm 104 and a nut 116 is threaded onto the lower end of the bolt. A spring seat 118 is movably mounted upon the nut 116. A spring 120 is interposed between the spring seats 106 and 118. Thus, the arm 104 is normally urged downwardly, whereby the latching element 86 is also urged downwardly.

The upright wall 43 of the frame 30 carries a post 122 forming a pivot for a bell crank lever 124. This bell crank lever is provided with a camming section 126 which extends below the extreme lower ends of the arm 104 and is adapted to engage the underside of the arm for lifting the same. The bell crank lever is moved to arm lifting position by a link 128. This link is actuated manually by a bell crank lever 130 which is pivoted on a pin 132. The bell crank lever 130 is provided with a handle 134 for moving the lever 130 in a clockwise direction whereby the cam 126 is actuated through the link 128 and the bell crank lever 124 to lift the arm 104 and the latching element 86.

When the bell crank lever 130 is in its latching position, the forward end of handle 134 immediately overlies the rear end of arm 104 and is yieldingly held in overlying position by a spring 150 to assure prevention of unintentional upward movement of arm 104.

The floor 56 carries a plate 136 and this plate carries a forwardly facing abutment 138 and an integrally formed, rearwardly extending retainer 140. The central portion 143 thereof bears against the draw bar boss 84 for holding the same in the notch 94 in yoke 92 of the latching element 86. The opposite and rear ends 141 of the retainer 140 are inclined upwardly and rearwardly at a slight angle to form rearwardly facing camming surfaces. The plate 136, the retainer 140 and the abutment 138 are urged rearwardly by two springs 142 which are guided by bolts 144. These bolts are threaded into the upright section 54 of the frame 30 and are locked in place by lock nuts 146. The extent of rearward movement of the plate 136 is limited by the heads 148 of the bolts 144. A clearance is maintained between the heads 148 of the bolts and the rear of abutment 138 when the boss 84 of draw bar 24 is in the notch 94 of yoke 92. The plate 136 is restrained from upward movement by a pair of ears 149 which are suitably affixed to the forward ends of the guides 64 and 66 and extend over the plate 136.

When the latch frame 86 is lifted through the bell crank lever 124, the plate 136 will be shifted forwardly by the upward movement of the camming surfaces 96, on the yoke 92 of the latch element 86, against the camming surfaces 141 on the retainer 140. Such movement will further compress the springs 142. When the bottom edges of the camming surfaces 96 are raised above the top edge of camming surface 141, the springs 142 will force the retainer 140 below forward end of surface 96 on yoke 92, as is shown in FIG. 6. Also, it will be observed from FIG. 6 that the latch frame 86 is raised sufficiently so that the boss 84 on the draw bar 24 is movable rearwardly below the yoke 92 of the latching element 86 whereby the draw bar can be pulled rearwardly without frictional engagement with the latching element 82. After the draw bar is pulled rearwardly, it can be shifted to the right or left for convenient attachment to the tongue 28 of a trailer although the tongue is not in alignment with the center of the hitch frame 30.

The spring 150 is suitably connected to the link 128 and with the frame section 32 to lower the cam 126 below the arm 104 sufficiently so that, when the latch retainer 140 is rendered ineffective, the spring 120 can force the latch frame downwardly.

After the tongue 28 of the trailer is hitched to the rearwardly extended draw bar 24, by pushing the trailer forwardly or by moving the automobile rearwardly, the boss 84 on the draw bar 24, will be guided into slot 63 by either of the guides 64 or 66. The boss, upon engaging the retainer 140, causes the plate 136 to be moved forwardly relative to the latch frame 86, further compressing the springs 142. When the boss 84 has moved camming surfaces 141 forwardly sufficiently to clear the latch camming surfaces 96 on the latching element 86, the spring 120 acting on the arm 104, pulls the latching element 86 downwardly so that it is in latching position with the boss 84.

It will be observed from FIGS. 4 and 6 that the distance between the rear notch forming wall 95 of notch 94 in yoke 92 and the upper edge of camming surfaces 141 on abutment 138 is slightly less than the fore and aft thickness of boss 84 on draw bar 24. When the latch frame is in latching position, the rear face 143 of retainer 140 is bearing on the front face of the boss 84 and the rear face of the boss is bearing against surface 95 of the notch 94. Since the distance between the rear notch forming wall 95 and the upper edge of camming surface 96 is slightly less than the fore and aft thickness of boss 84, the camming surfaces 141 do not interfere with the function of surface 143 on the boss.

It will also be observed that the distance between the lower edge of wall 95 and the lower edge of inclined surfaces 96, is slightly greater than the fore and aft thickness of boss 84. Therefore, the yoke 92 of the U-shaped latching element 86 cannot drop to latching position until the rear face of boss 84 passes forwardly of the forwardly facing wall 95 of the yoke, whereby the latching element can then drop freely.

Coil springs 160 are interposed between the spring retainers 158 and the arms 98 and 100 of the latching element 86. The spirngs are guided by bolts 162 which pass freely through holes 164 in the arms 98 and 100. These bolts are threaded into the upright plate 54 of the frame 30 and are held in locked position by lock nuts 166. The heads of the bolt 168 rest against the rear side of the spring retainers 158.

After the boss 84 is latched with the latching element 86, then forward movement of the automobile will cause the frame 30, including the upright walls 54 to be moved forwardly, pulling the bolts 162 and the retainers 158 forwardly. The latching element 86 will be pulled forwardly through the springs 160, and, inasmuch as boss 84 is in latching position with the latching element 86, the draw bar 24 and the trailer will be pulled forwardly. Upon rearward movement of the automobile, the plate of the upright section 54 of the frame 30 will be moved rearwardly to compress the springs 142 to, in turn, move the boss 84 and the draw bar 24 rearwardly through the retainer 140. Rearward movement can be imparted to the trailer, by the automobile since upon rearward movement of the automobile, the boss 84 of the draw bar 24 is locked between the retainer 140 and the yoke 92 of the latching element 86. Rearward movement of the vehicle frame section 54 forces the springs 142 and the plate 136, carrying the retainer 140, rearwardly and against the boss 84.

In addition to the function heretofore set forth for the springs 142 and 160, they prevent rattling between the boss and the latching element 86, which would normally occur due to the jiggling action between the towed and pulling vehicles, since these elements are in engagement under spring pressure constantly.

Should any dirt or water enter between the latching surfaces, which is not likely to occur, such dirt or water would be immediately dissipated by any movement between the latching surfaces; therefore, there is no tendency for water to freeze and tend to lock the latching surfaces with one another, nor can dirt accumulate between the latching surfaces.

A particular advantage of the present invention lies in the fact that the draw bar can be extended and then swung to the right or the left whereby it can readily be connected with a trailer tongue which is not in direct alignment with the vehicle, i.e, to the right or left and with varying distances rearwardly of the vehicle. Also, ample room is provided between the rear of the vehicle and the trailer for the ready manipulation of the coupling pin 26.

While the form of embodiment herein shown and described constitutes preferred form, it is to be understood that other forms may be adopted falling within the scope of the claims that follow.

I claim:
1. A combination comprising:
   (A) a vehicle including:
      (1) a frame having:
         (a) a support for a draw bar;
         (b) a latching element movably connected with the frame;
      (2) a rearwardly extending draw bar carried by the support, said draw bar including:
         (a) a shoulder forming a second latching element co-operable with the first mentioned latching element to form a latch;
      (3) means on the frame for moving the first mentioned latching element out of latching position with the latching element on the draw bar;
      (4) means for retaining the latching elements in non-latching position subsequent to the action of said means (3) whereby the draw bar can be moved rearwardly relative to the vehicle frame;
      (5) means responsive to the forward movement of the draw bar, subsequent to the rearward movement thereof, for rendering said retaining means ineffective and for moving said first mentioned latching element into latching position with the latching element on the draw bar;
      (6) resilient means between the first mentioned latching element and the vehicle frame normally biasing the said first mentioned latching means forwardly when the latching elements are in latched position.

2. A combination as defined in claim 1, characterized to include:
   (7) resilient means between the latching element on the draw bar and the vehicle frame normally biasing the draw bar rearwardly.

3. A combination comprising:
   (A) a vehicle including:
      (1) a frame having:
         (a) a support for a draw bar;
         (b) a latching element movably connected with the frame;
      (2) a rearwardly extending draw bar carried by the support, said draw bar including:
         (a) a shoulder forming a second latching element co-operable with the first mentioned latching element to form a latch;
      (3) means on the frame for moving the first mentioned latching element out of latching position with the latching element on the draw bar;
      (4) means for retaining the latching elements in non-latching position subsequent to the action of said means (3) whereby the draw bar can be moved rearwardly relative to the vehicle frame;
      (5) means responsive to the forward movement of the draw bar, subsequent to the rearward movement thereof, for rendering said retaining means ineffective and for moving said first mentioned latching element into latching position with the latching element on the draw bar;
      (6) resilient means between the latching element on the draw bar and the vehicle frame normally biasing the draw bar rearwardly.

4. A combination comprising:
   (A) a vehicle including:
      (1) a frame having:
         (a) a support for a draw bar;
         (b) a latching element movably connected with the frame;
      (2) a rearwardly extending draw bar carried by the support, said draw bar including:
         (a) a shoulder forming a second latching element co-operable with the first mentioned latching element to form a latch;
      (3) means on the frame for moving the first mentioned latching element out of latching position with the latching element on the draw bar;
      (4) means for retaining the latching elements in non-latching position subsequent to the action of said means (3) whereby the draw bar can be moved rearwardly relative to the vehicle frame;
      (5) means responsive to the forward movement of the draw bar, subsequent to the rearward movement thereof, for rendering said retaining means ineffective and for moving said first mentioned latching element into latching position with the latching element on the draw bar, said last mentioned means (5) including:
         (a) a retaining shoulder;
         (b) and means for normally biasing the retaining shoulder into a position for preventing latching engagement of the first mentioned latching element with the latching element on the draw bar;
      (6) means normally biasing the first mentioned latching element into latching position with the latching element on the draw bar; and further characterized in that means (3) for moving the first mentioned element out of latching position with the latching element on the draw bar includes:
         (a) an actuating member movable to a position for engaging and moving the first mentioned actuating member to non-latching position with the latching element on the draw bar and movable to a position away from the first mentioned latching element whereby the latching elements are retained in non-latching postion solely by the retainer shoulder (6)(a).

5. A combination comprising:
   (A) a vehicle including:
      (1) a frame having:
         (a) a support for a draw bar;
         (b) a latching element movably connected with the frame;
      (2) a rearwardly extending draw bar carried by the support, said draw bar including:
         (a) a shoulder forming a second element co-operable with the first mentioned latching element to form a latch;
      (3) means on the frame for moving the first mentioned latching element out of latching position with the latching element on the draw bar;
      (4) means for retaining the latching elements in non-latching position subsequent to the action of said means (3) whereby the draw bar can be moved rearwardly relative to the vehicle frame;
      (5) means responsive to the forward movement of the draw bar, subsequent to the rearward movement thereof, for rendering said retaining means ineffective and for moving said first mentioned latching element into latching position with the latching element on the draw bar;
      (6) forwardly and inwardly extending guides, one being disposed on one side of the boss and the other on the opposite side of the boss when the draw bar is moved rearwardly from its latched position, and disposed for guiding the boss to its latching position when moved forwardly for latching engagement with the first mentioned latching element;
(7) resilient means between the first mentioned latching element and the vehicle frame normally biasing the said first mentioned latching means forwardly when the latching elements are in latched position;
(8) resilient means between the latching element on the draw bar and the vehicle frame normally biasing the draw bar rearwardly.

References Cited

UNITED STATES PATENTS

| | | | |
|---|---|---|---|
| 2,451,660 | 10/1948 | Clark et al. | 280—478 |
| 2,973,971 | 3/1961 | Oddson. | |
| 3,140,881 | 7/1964 | Antici. | |

FOREIGN PATENTS 839,387   6/1960   Great Britain.

LEO FRIAGLIA, *Primary Examiner.*